US012288638B2

(12) United States Patent
Jung

(10) Patent No.: US 12,288,638 B2
(45) Date of Patent: Apr. 29, 2025

(54) COIL COMPONENT

(71) Applicant: SAMSUNG ELECTRO-MECHANICS CO., LTD., Suwon-si (KR)

(72) Inventor: Hyun Ju Jung, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 761 days.

(21) Appl. No.: 17/218,955

(22) Filed: Mar. 31, 2021

(65) Prior Publication Data

US 2022/0189680 A1 Jun. 16, 2022

(30) Foreign Application Priority Data

Dec. 14, 2020 (KR) ........................ 10-2020-0174346

(51) Int. Cl.
*H01F 27/29* (2006.01)
*H01F 27/28* (2006.01)

(52) U.S. Cl.
CPC ......... *H01F 27/29* (2013.01); *H01F 27/2804* (2013.01); *H01F 2027/2809* (2013.01)

(58) Field of Classification Search
CPC ......... H01F 17/0013; H01F 2027/2809; H01F 17/0006; H01F 27/2804; H01F 5/003; H01F 27/29; H01F 27/292
USPC .................................................. 336/200, 232
See application file for complete search history.

(56) References Cited

U.S. PATENT DOCUMENTS

2015/0048915 A1 2/2015 Yoon et al.

FOREIGN PATENT DOCUMENTS

| | | | | | |
|---|---|---|---|---|---|
| CN | 102810382 | A | * | 12/2012 | ......... H01F 17/0013 |
| KR | 2011089201 | A | * | 8/2011 | ......... H01F 17/0013 |
| KR | 10-2015-0019730 | A | | 2/2015 | |
| KR | 10-2016-0031391 | A | | 3/2016 | |
| KR | 2016031391 | A | * | 3/2016 | ............ B22F 1/0062 |
| KR | 2017097493 | A | * | 8/2017 | ......... H01F 17/0013 |
| KR | 10-2018-0014593 | A | | 2/2018 | |
| KR | 2018014593 | A | * | 2/2018 | ......... H01F 17/0013 |
| KR | 2018046830 | A | * | 5/2018 | ......... H01F 17/0013 |
| KR | 2018116604 | A | * | 10/2018 | ............. H01F 27/28 |
| KR | 2025709 | B1 | * | 9/2019 | ............. C22C 38/02 |

* cited by examiner

*Primary Examiner* — Tszfung J Chan
(74) *Attorney, Agent, or Firm* — Morgan, Lewis & Bockius LLP

(57) ABSTRACT

A coil component includes a body; a coil portion disposed in the body and including a lead-out pattern; an external electrode disposed on a first surface of the body; and a plurality of connection vias disposed in the body, connecting the external electrode to the lead-out pattern, and integrated with each other, wherein, in each of the plurality of connection vias, a size of an end surface area of a lower portion adjacent to the external electrode is different from a size of an end surface area of an upper portion adjacent to the lead-out pattern.

14 Claims, 10 Drawing Sheets

'B'

COIL COMPONENT

CROSS-REFERENCE TO RELATED APPLICATION(S)

This application claims benefit of priority to Korean Patent Application No. 10-2020-0174346 filed on Dec. 14, 2020 in the Korean Intellectual Property Office, the disclosure of which is incorporated herein by reference in its entirety.

TECHNICAL FIELD

The present disclosure relates to a coil component.

BACKGROUND

An inductor, a coil component, is a representative passive electronic component used in electronic devices together with a resistor and a capacitor.

An external electrode may be disposed on a surface of a coil component, and an overall size of the coil component may be determined according to a position and a volume of the external electrode. An effective volume of a magnetic material may change according to the position and volume of the external electrode even in a coil component having the same volume.

Also, in the case of a coil component, as a material for forming a coil may be different from a material for forming a body, cracks or delaminations may occur between the coil and the body.

SUMMARY

An aspect of the present disclosure is to provide a coil component which may improve an effective volume of a magnetic material by an electrode structure disposed on a lower surface.

Another aspect of the present disclosure is to provide a coil component which may prevent delamination between a coil portion and a body.

According to an aspect of the present disclosure, a coil component includes a body; a coil portion disposed in the body and including a lead-out pattern; an external electrode disposed on a first surface of the body; and a plurality of connection vias disposed in the body, connecting the external electrode to the lead-out pattern, and integrated with each other, wherein, in each of the plurality of connection vias, a size of an end surface area of a lower portion adjacent to the external electrode is different from a size of an end surface area of an upper portion adjacent to the lead-out pattern.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
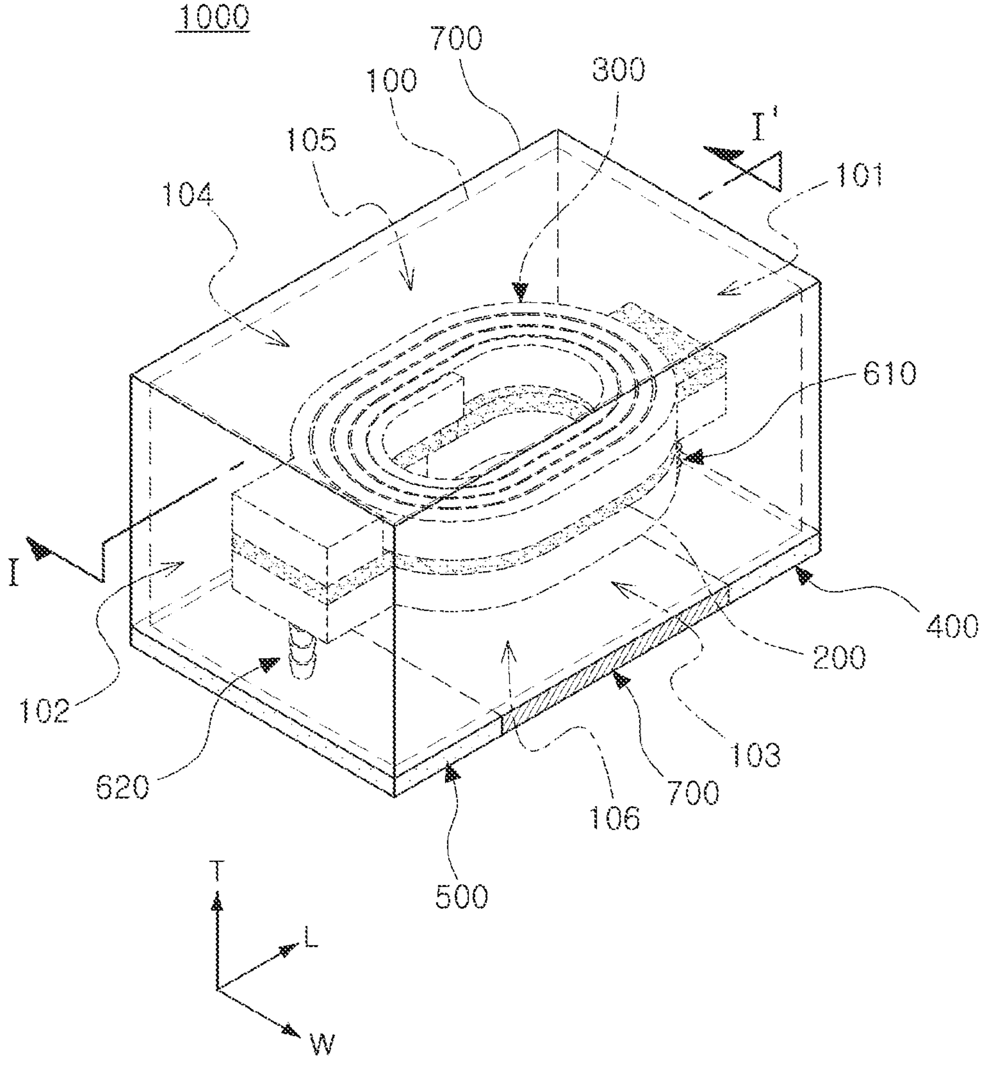
FIG. 1 is a diagram illustrating a coil component according to a first example embodiment of the present disclosure.

The terms used in the example embodiments are used to simply describe an example embodiment, and are not intended to limit the present disclosure. A singular term includes a plural form unless otherwise indicated. The terms, “include,” “comprise,” “is configured to,” etc. of the description are used to indicate the presence of features, numbers, steps, operations, elements, parts or combination thereof, and do not exclude the possibilities of combination or addition of one or more features, numbers, steps, operations, elements, parts or combination thereof. Also, the term “disposed on,” “positioned on,” and the like, may indicate that an element is positioned on or beneath an object, and does not necessarily mean that the element is positioned on the object with reference to a gravity direction.

The term “coupled to,” “combined to,” and the like, may not only indicate that elements are directly and physically in contact with each other, but also include the configuration in which the other element is interposed between the elements such that the elements are also in contact with the other component.

Sizes and thicknesses of elements illustrated in the drawings are indicated as examples for ease of description, and example embodiments in the present disclosure are not limited thereto.

In the drawings, an L direction is a first direction or a length direction, a W direction is a second direction or a width direction, a T direction is a third direction or a thickness direction.

In the descriptions described with reference to the accompanied drawings, the same elements or elements corresponding to each other will be described using the same reference numerals, and overlapped descriptions will not be repeated.

In electronic devices, various types of electronic components may be used, and various types of coil components may be used between the electronic components to remove noise, or for other purposes.

In other words, in electronic devices, a coil component may be used as a power inductor, a high frequency inductor, a general bead, a high frequency bead, a common mode filter, and the like.

First Example Embodiment and Modified Example

Figure 2:
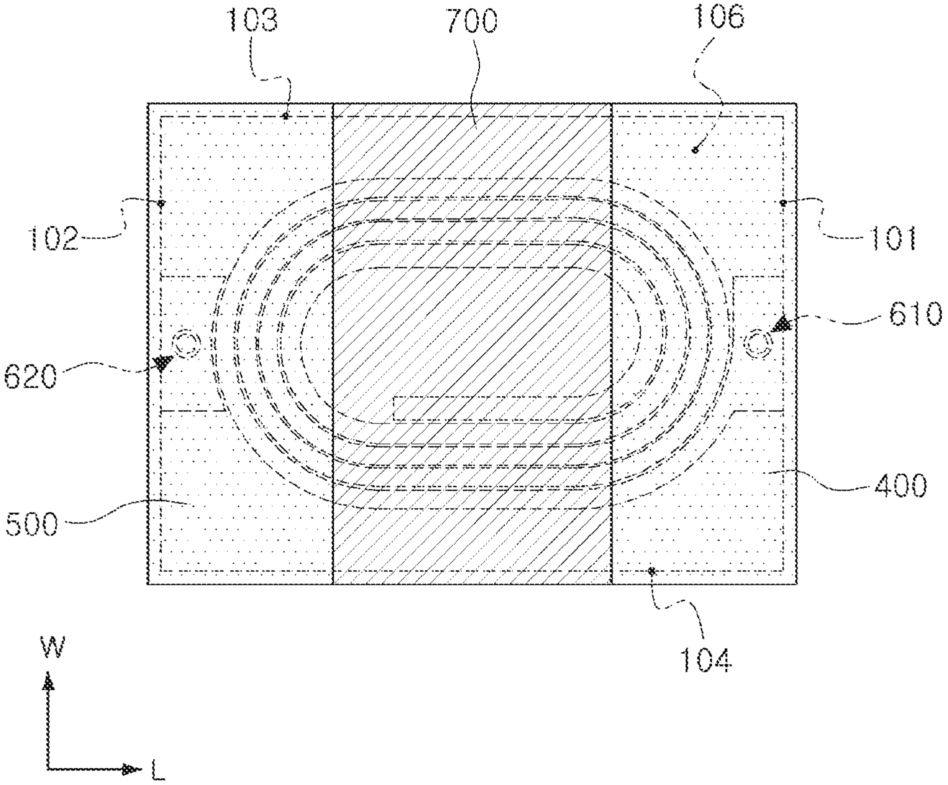
FIG. 2 is a diagram illustrating the coil component illustrated in FIG. 1, viewed from below.
Figure 3:
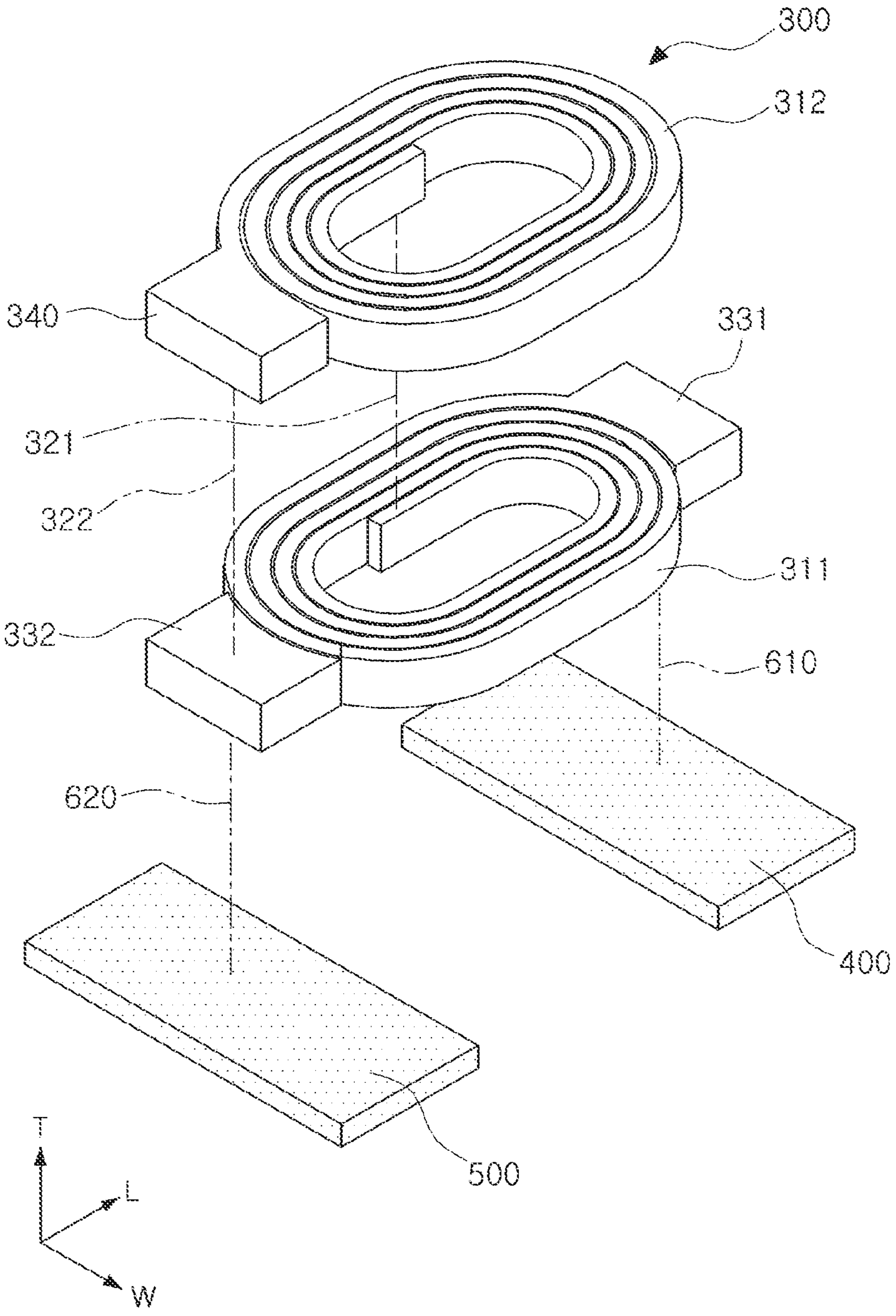
FIG. 3 is an exploded diagram illustrating a connection relationship among a coil portion, a connection electrode, and an external electrode.
Figure 4:
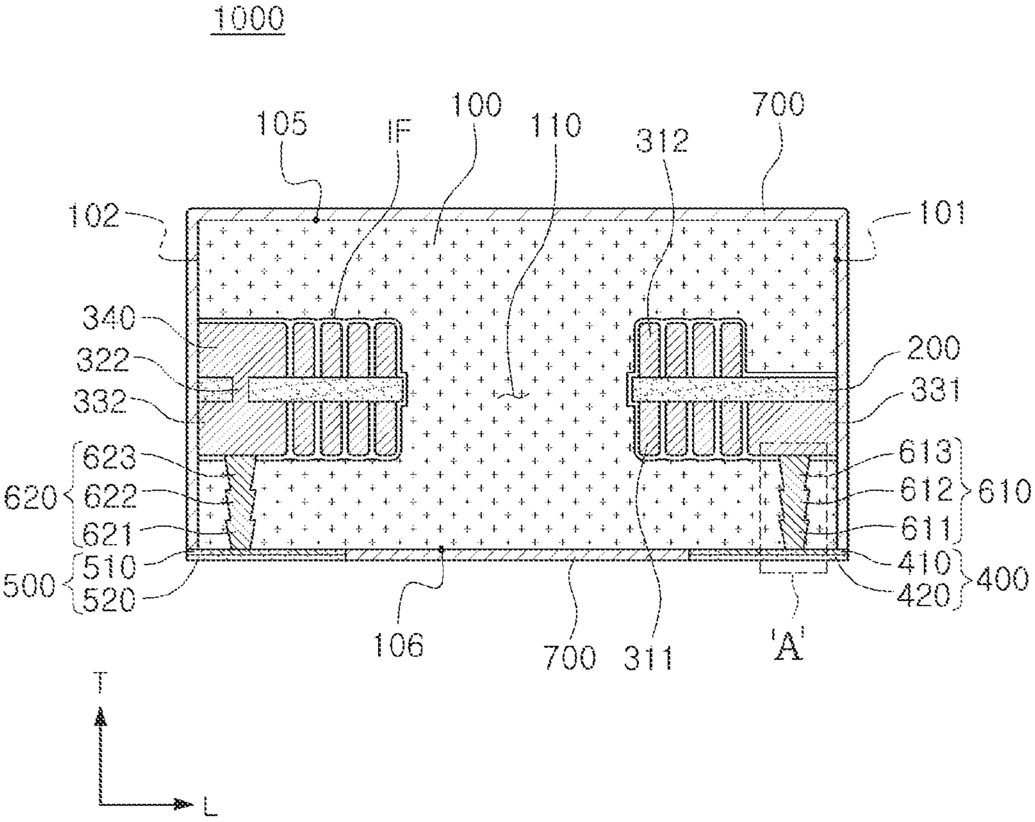
FIG. 4 is a cross-sectional diagram along line I-I' in FIG. 1.
Figure 5:
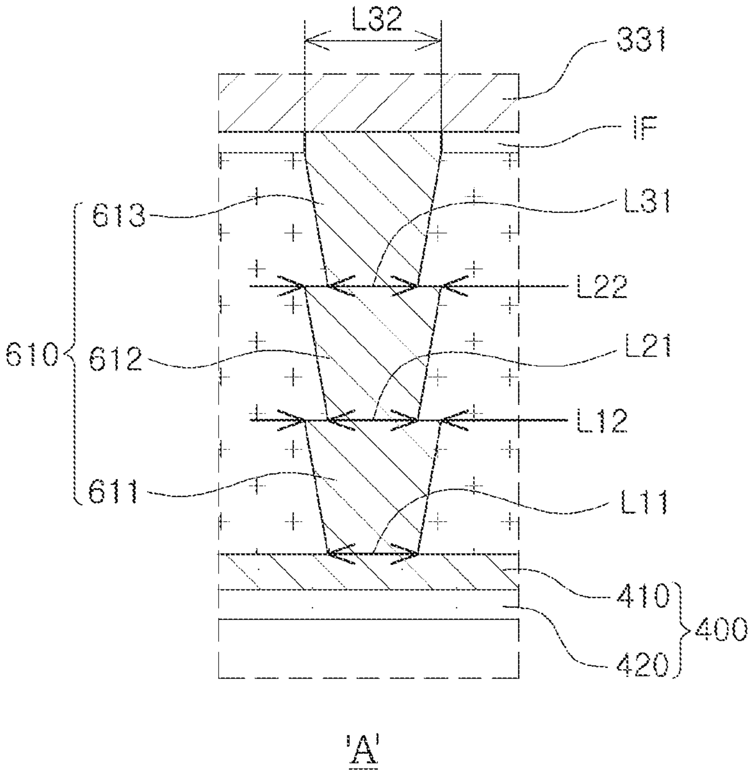
FIG. 5 is an enlarged diagram illustrating portion A illustrated in FIG. 4.

FIG. 1 is a diagram illustrating a coil component according to a first example embodiment. FIG. 2 is a diagram illustrating the coil component illustrated in FIG. 1, viewed from below. FIG. 3 is an exploded diagram illustrating a connection relationship between a coil portion, a connection electrode, and an external electrode. FIG. 4 is a cross-sectional diagram along line I-I' in FIG. 1. FIG. 5 is an enlarged diagram illustrating portion A illustrated in FIG. 4.

Referring to FIGS. 1 to 5, the coil component 1000 in the first example embodiment may include a body 100, a support substrate 200, a coil portion 300, first and second external electrodes 400 and 500, first and second connection electrodes 610 and 620, and a surface insulating layer 700, and may further include an insulating film IF.

The body 100 may form an exterior of the coil component 1000 in the example embodiment, and the support substrate 200 and the coil portion 300 may be disposed in the body 100.

The body 100 may have a hexahedral shape.

With reference to the directions illustrated in FIGS. 1, 2, and 4, the body 100 may include a first surface 101 and a second surface 102 opposing each other in a length direction L, a third surface 103 and a fourth surface 104 opposing each other in a width direction W, and a fifth surface 105 and a sixth surface 106 opposing each other in a thickness direction T. The first to fourth surfaces 101, 102, 103, and 104 of the body 100 may be walls of the body 100 connecting the fifth surface 105 to the sixth surface 106 of the body 100. In the description below, both end surfaces (one end surface and the other end surface) of the body 100 may refer to the first surface 101 and the second surface 102 of the body 100, both side surfaces (one side surface and the other side surface) of the body 100 may refer to the third surface 103 and the fourth surface 104 of the body 100, and one surface and the other surface of the body 100 may refer to the sixth surface 106 and the fifth surface 105 of the body 100, respectively. The sixth surface 106 of the body 100 may be provided as a mounting surface when the coil component 1000 in the example embodiment is mounted on a mounting substrate such as a printed circuit board.

The body 100 may be formed such that the coil component 1000 in which the first and second external electrodes 400 and 500 and the surface insulating layer 700 are formed may have a length of 2.0 mm, a width of 1.2 mm, and a thickness of 0.65 mm, for example, but an example embodiment thereof is not limited thereto. The above-mentioned sizes are example sizes determined without consideration of a process error, and an example of the sizes is not limited thereto.

The length of the coil component 1000 described above may refer to a maximum value of dimensions of a plurality of lines connecting an outermost boundary of the coil component 1000 and parallel to the length direction L, the coil component 1000 illustrated in the image of a cross-sectional surface of a central portion of the coil component 1000 in the width direction W, taken in the length direction L and the thickness direction T, obtained by an optical microscope or a scanning electron microscope (SEM). Alternatively, the length of the coil component 1000 described above may refer to an arithmetic mean value of dimensions of at least two of a plurality of lines connecting an outermost boundary of the coil component 1000 and parallel to the length direction L, the coil component 1000 illustrated in the image of the cross-sectional surface.

The thickness of the coil component 1000 described above may refer to a maximum value of dimensions of a plurality of lines connecting an outermost boundary of the coil component 1000 and parallel to the thickness direction T, the coil component 1000 illustrated in the image of a cross-sectional surface of a central portion of the coil component 1000 in the width direction W, taken in the length direction L and the thickness direction T, obtained by an optical microscope or a scanning electron microscope (SEM). Alternatively, the thickness of the coil component 1000 described above may refer to an arithmetic mean value of dimensions of at least two of a plurality of lines connecting an outermost boundary of the coil component 1000 and parallel to the thickness direction T, illustrated in the image of the cross-sectional surface.

The width of the coil component 1000 described above may refer to a maximum value of dimensions of a plurality of lines connecting an outermost boundary of the coil component 1000 and parallel to the width direction W, the coil component 1000 illustrated in the image of a cross-sectional surface of a central portion of the coil component 1000 in the thickness direction T, taken in the length direction L and the thickness direction T, obtained by an optical microscope or a scanning electron microscope (SEM). Alternatively, the width of the coil component 1000 described above may refer to an arithmetic mean value of dimensions of at least two of a plurality of lines connecting an outermost boundary of the coil component 1000 and parallel to the width direction W, the coil component 1000 illustrated in the image of the cross-sectional surface.

Alternatively, each of the length, the width, and the thickness of the coil component 1000 may be measured by a micrometer measurement method. In the micrometer measurement method, a zero point may be set by a gauge repeatability and reproducibility (R&R) micrometer, the coil component 1000 in the example embodiment may be inserted between tips of the micrometer, and the measuring may be performed by rotating a measurement lever of the micrometer. In measuring the length of the coil component 1000 by the micrometer measurement method, the length of the coil component 1000 may refer to a value of the length measured once or an arithmetic mean of values of the length measured multiple times. This configuration may also be applied to the width and the thickness of the coil component 1000.

The body 100 may include an insulating resin and a magnetic material. Specifically, the body 100 may be formed by stacking one or more magnetic composite sheets in which a magnetic material is dispersed in an insulating resin. The magnetic material may be ferrite or metal magnetic powder.

The ferrite may include, for example, one or more materials of a spinel ferrite such as an Mg—Zn ferrite, an Mn—Zn ferrite, an Mn—Mg ferrite, a Cu—Zn ferrite, an Mg—Mn—Sr ferrite, an Ni—Zn ferrite, and the like, a hexagonal ferrite such as a Ba—Zn ferrite, a Ba—Mg ferrite, a Ba—Ni ferrite, a Ba—Co ferrite, a Ba—Ni—Co ferrite, and the like, a garnet ferrite such as a Y ferrite, and a Li ferrite.

The magnetic metal powder may include one or more selected from a group consisting of iron (Fe), silicon (Si), chromium (Cr), cobalt (Co), molybdenum (Mo), aluminum (Al), niobium (Nb), copper (Cu), and nickel (Ni). For example, the magnetic metal powder may be one or more of a pure iron powder, a Fe—Si alloy powder, a Fe—Si—Al alloy powder, a Fe—Ni alloy powder, a Fe—Ni—Mo alloy powder, Fe—Ni—Mo—Cu alloy powder, a Fe—Co alloy powder, a Fe—Ni—Co alloy powder, a Fe—Cr alloy powder, a Fe—Cr—Si alloy powder, a Fe—Si—Cu—Nb alloy powder, a Fe—Ni—Cr alloy powder, and a Fe—Cr—Al alloy powder.

The magnetic metal powder may be amorphous or crystalline. For example, the magnetic metal powder may be a Fe—Si—B—Cr amorphous alloy powder, but an example embodiment of the magnetic metal powder is not limited thereto.

Each particle of the ferrite and the magnetic metal powder may have an average diameter of 0.1 μm to 30 μm, but an example of the average diameter is not limited thereto.

The body 100 may include two or more types of magnetic materials dispersed in resin. The notion that types of the magnetic materials are different may indicate that one of an average diameter, a composition, crystallinity, and a form of a magnetic material disposed in a resin is different from those of the other magnetic material(s).

In the description below, a magnetic material may be implemented as a magnetic metal power, but the example embodiment is not only limited to the body 100 having a structure in which a magnetic metal power is dispersed in an insulating region.

The insulating resin may include one of an epoxy, a polyimide, a liquid crystal polymer, or mixtures thereof, but the example of the resin is not limited thereto.

The body 100 may include a core 110 penetrating the support substrate 200 and the coil portion 300. The core 110 may be formed by filling a through-hole penetrating a central portion of each of the coil portion 300 and the support substrate 200 with a magnetic composite sheet, but an example embodiment thereof is not limited thereto.

The support substrate 200 may be buried in the body 100. The support substrate 200 may support the coil portion 300.

The support substrate 200 may be formed of an insulating material including a thermosetting insulating resin such as an epoxy resin, a thermoplastic insulating resin such as a polyimide, or a photosensitive insulating resin, or may be formed of an insulating material including a reinforcing material such as a glass fiber or an inorganic filler with the above-described insulating resin. For example, the support substrate 200 may be formed of an insulating material such as prepreg, Ajinomoto Build-up Film (ABF), FR-4, a bismaleimide triazine (BT) resin, a photoimageable dielectric (PID), and the like, but an example of the material of the internal insulating layer is not limited thereto.

As an inorganic filler, one or more materials selected from a group consisting of silica ($SiO_2$), alumina ($Al_2O_3$), silicon carbide (SiC), barium sulfate ($BaSO_4$), talc, mud, a mica powder, aluminum hydroxide ($Al(OH)_3$), magnesium hydroxide ($Mg(OH)_2$), calcium carbonate ($CaCO_3$), magnesium carbonate ($MgCO_3$), magnesium oxide (MgO), boron nitride (BN), aluminum borate ($AlBO_3$), barium titanate ($BaTiO_3$), and calcium zirconate ($CaZrO_3$) may be used.

When the support substrate 200 is formed of an insulating material including a reinforcing material, the support substrate 200 may provide improved stiffness. When the support substrate 200 is formed of an insulating material which does not include a glass fiber, a thickness of the coil component 1000 in the example embodiment may be reduced. Also, with reference to a component having the same volume, an effective volume of the coil portion 300 and/or a magnetic material may be increased, such that component properties may improve. When the support substrate 200 is formed of an insulating material including a photosensitive insulating resin, the number of processes for forming the coil portion 300 may be reduced, such that production cost may be reduced, and fine vias may be formed.

The coil portion 300 may be buried in the body 100 and may exhibit properties of a coil component. For example, when the coil component 1000 is used as a power inductor, the coil portion 300 may store an electrical field as a magnetic field and may maintain an output voltage, thereby stabilizing power of an electronic device.

The coil portion 300 may include coil patterns 311 and 312, first and second lead-out patterns 331 and 332, sub-lead-out patterns 340, and through vias 321 and 322.

Specifically, with reference to the directions in FIGS. 1 and 4, the first coil pattern 311, the first lead-out pattern 331, and the second lead-out pattern 332 may be disposed on a lower surface of the support substrate 200 opposing the sixth surface 106 of the body 100, and the second coil pattern 312 and the sub-lead-out pattern 340 may be disposed on the upper surface of the support substrate 200 opposing the lower surface of the support substrate 200.

Referring to FIGS. 1, 3 and 4, on the lower surface of the support substrate 200, the first coil pattern 311 may be in contact with and connected to the first lead-out pattern 331, the first coil pattern 311 and the first lead-out pattern 331 may be spaced apart from the second lead-out pattern 332. Also, on the upper surface of the support substrate 200, the second coil pattern 312 may be spaced apart from the sub-lead-out pattern 340. Also, the first through via 321 may penetrate the support substrate 200 and may be connected to and in contact with internal ends of each of the first coil pattern 311 and the second coil pattern 312, and the second through via 322 may penetrate the support substrate 200 and may be connected to and in contact with each of the second lead-out pattern 332 and the sub-lead-out pattern 340. The first lead-out pattern 331 may be connected to the first external electrode 400 by the first connection electrode 610. The second lead-out pattern 332 may be connected to the second external electrode 500 by the second connection electrode 620. Accordingly, the coil portion 300 may function as a single coil connected in series between the first external electrode 400 and the second external electrode 500.

Each of the first coil pattern 311 and the second coil pattern 312 may have a planar spiral shape forming at least one turn around the core 110 of the body 100. As an example, the first coil pattern 311 may form at least one turn around the core 110 on a lower surface of the support substrate 200.

The first and second lead-out patterns 331 and 332 and the sub-lead-out pattern 340 may be exposed to the first and second surfaces 101 and 102 of the body 100. For example, the first lead-out pattern 331 may be exposed to the first surface 101 of the body 100, and the second lead-out pattern 332 may be exposed to the second surface 102 of the body 100. Also, the sub-lead-out pattern 340 may be exposed to the second surface 102 of the body 100.

At least one of the coil patterns 311 and 312, the through vias 321 and 322, the first and second lead-out patterns 331 and 332, and the sub-lead-out pattern 340 may include at least one or more conductive layer.

As an example, when the second coil pattern 312, the sub-lead-out pattern 340, and the through vias 321 and 322 are formed on the other surface of the support substrate 200 by a plating process, each of the second coil pattern 312, the sub-lead-out pattern 340, and the through vias 321 and 322 may include a seed layer and an electrolytic plating layer formed by an electroless plating or vapor deposition. The electrolytic plating layer may have a single layer structure or a multilayer structure. The electrolytic plating layer having a multilayer structure may be formed in conformal film structure in which an electrolytic plating layer is covered by another electrolytic plating layer, or a structure in which an electrolytic plating layer is only layered on a first surface of one of the electrolytic plating layers. The seed layer of the second coil pattern 312, the seed layer of the sub-lead-out pattern 340, and the seed layer of the through vias 321 and

322 may be integrated with each other such that a boundary may not be formed therebetween, but an example embodiment thereof is not limited thereto. The electrolytic plating layer of the second coil pattern 312, the electrolytic plating layer of the sub-lead-out pattern 340, and the electrolytic plating layer of the through vias 321 and 322 may be integrated with each other such that a boundary may not be formed therebetween, but an example embodiment thereof is not limited thereto.

Each of the coil patterns 311 and 312, the first and second lead-out patterns 331 and 332, the sub-lead-out patterns 340 and the through vias 321 and 322 may be formed of a conductive material such as copper (Cu), aluminum (Al), silver (Ag), tin (Sn), gold (Au), nickel (Ni), lead (Pb), titanium (Ti), or alloys thereof, but an example of the material is not limited thereto.

The first and second external electrodes 400 and 500 may be disposed on the sixth surface 106 of the body 100 and may be spaced apart from each other. In the example embodiment, the first and second external electrodes 400 and 500 may not extend to each of the first to fifth surfaces 101, 102, 103, 104 and 105 of the body 100. Therefore, in the example embodiment, a ratio occupied by the external electrode in each of the width and length of the component may be reduced. Accordingly, the effective volume of the magnetic material volume may improve in the component having the same volume.

The first and second external electrodes 400 and 500 may be formed in a single-layer structure or a multiple-layer structure. In the example embodiment, the first and second external electrodes 400 and 500 may include first conductive layers 410 and 510 in contact with the sixth surface 106 of the body 100, and second conductive layers 420 and 520 disposed on the first conductive layers 410 and 510. In other words, the first external electrode 400 may include the first conductive layer 410 in contact with the sixth surface 106 of the body 100, and the second conductive layer 420 disposed on the first conductive layer 410. The second external electrode 500 may include the first conductive layer 510 in contact with the sixth surface 106 of the body 100 and the second conductive layer 520 disposed on the first conductive layer 510.

The first and second external electrodes 400 and 500 may be formed of a conductive material such as copper (Cu), aluminum (Al), silver (Ag), tin (Sn), gold (Au), nickel (Ni), lead (Pb), chromium (Cr), titanium (Ti), or alloys thereof, but an example of the material is not limited thereto. For example, the first conductive layers 410 and 510 may include copper (Cu). The second conductive layers 420 and 520 may include nickel (Ni) and tin (Sn). The second conductive layers 420 and 520 may have, for example, a multilayer structure including a first layer disposed on the first conductive layers 410 and 510 and including nickel (Ni), and a second layer disposed on the first layer and including tin (Sn).

The first and second external electrodes 400 and 500 may be formed by a vapor deposition method such as sputtering and/or a plating method, but an example embodiment thereof is not limited thereto.

The first and second connection electrodes 610 and 620 may include a plurality of connection vias 611, 612, 613, 621, 622, and 623, and may penetrate the body 100 and may connect the first and second external electrodes 400 and 500 to and the first and second lead-out patterns 331 and 332. For example, the first connection electrode 610 may include the plurality of first connection vias 611, 612, and 613, may be disposed in the body 100, and may connect the first lead-out pattern 331 to the first external electrode 400. The second connection electrode 620 may include a plurality of second connection vias 621, 622, and 623, and may be disposed in the body 100 and may be spaced apart from the first connection electrode 610, and may connect the second lead-out pattern 332 to the second external electrode 500. In other words, in the example embodiment, the first and second external electrodes 400 and 500 may be connected to the first and second lead-out patterns 331 and 332 through the first and second connection electrodes 610 and 620 disposed in the body 100, rather than by the surface of the body 100. In the description below, only the first connection via 610 and the plurality of first connection vias 611, 612, and 613 will be described in greater detail for ease of description. The same description may also be applied to the second connection via 620 and the plurality of second connection vias 621, 622, and 623.

In each of the plurality of first connection vias 611, 612, and 613, a size of an end surface area of a lower portion adjacent to the first external electrode 400 may be different from a size of an end surface area of an upper portion adjacent to the first lead-out pattern 331. In the example embodiment, in each of the plurality of first connection vias 611, 612, and 613, an end surface area of the lower portion may be smaller than an end surface area of the upper portion. Specifically, with reference to the directions in FIGS. 4 and 5, in the lowermost first connection via 611 in contact with the first external electrode 400, an end surface area of the lower portion may be smaller than an end surface area of the upper portion. Also, in the uppermost first connection via 613 in contact with the first lead-out pattern 331, an end surface area of the lower portion may be smaller than an end surface area of the upper portion. Also, in the intermediate first connection via 612 disposed between the lowermost first connection via 611 and the uppermost first connection via 613, an end surface area of the lower portion may be smaller than an end surface area of the upper portion. As an example, the end surface area of the lowermost first connecting via 611 may refer to a cross-sectional area of the lowermost first connecting via 611 on a cross-sectional surface parallel to the sixth surface 106 of the body 100. This description may also be applied to the intermediate first connection via 612 and the uppermost first connection via 613. The shape of the cross-sectional surface of each of the first connection vias 611, 612, and 613 may be a circular shape, for example, and the shapes of the cross-sectional surfaces of the first connection vias 611, 612 and 613 may be the same. Accordingly, the size relationship between the end surface areas of the upper and lower portions of the first connection vias 611, 612, and 613 may be the same as the size relationship among the lengths L11, L12, L21, L22, L31, and L32 of the upper and lower portions of the first connection vias 611, 612, and 613 taken in the length direction L illustrated in FIG. 5, illustrating the cross-sectional surface (L-T cross-sectional surface) along the length direction and the thickness direction. Since a shape of an end surface area of the lower portion is different from a shape of an end surface area of the upper portion in each of the plurality of first connection vias 611, 612, and 613, bonding force between the body 100 and the plurality of first connection vias 611, 612, and 613 may improve as compared to the example in which a shape of an end surface area of the lower portion is the same as a shape of an end surface area of the upper portion in each of the plurality of first connection vias 611, 612, and 613. Also, as an example, since an end surface area of the upper portion of the lowermost first connecting via 611 may be larger than an end surface area of the lower portion of the intermediate first connecting via 612, the upper surface of the lowermost first connection via 611 may include a region which may not be covered by the lower surface of the intermediate first connection via 612. Accordingly, due to the difference structure, the bonding force between the body 100 and the plurality of first connection vias 611, 612, and 613 may improve. The above-described difference structure may function as an anchor portion anchoring the first connection electrode 610. In at least one of the plurality of first connection vias 611, 612 and 613, a size of an end surface area may increase from the lower portion to the upper portion. In the example embodiment, each of the lowermost first connection via 611, the intermediate first connection via 612, and the uppermost first connection via 613 may have a tapered vertical cross-sectional surface of which a size of an end surface area may increase from the lower portion to the upper portion. The body 100 may be formed by laminating at least one magnetic composite sheet on each of the upper and lower portions of the support substrate 200 and the coil portion 300 and curing the magnetic composite sheet. For example, the structure in which an end surface area of the lower portion of the lowermost first connection via 611 is smaller than an end surface area of the upper portion described above may be implemented by forming a hole by irradiating a laser beam to an outermost magnetic composite sheet of the plurality of magnetic composite sheets laminated on the lower portion sides of the support substrate 200 and the coil portion 300 in a direction from an internal side towards an external side along a lamination direction, and laminating the sheets. By using the laser process, optical energy may vary according to a depth of the magnetic composite sheets, such that a hole having a shape corresponding to the size relationship between the end surface areas of the upper and lower portions of the lowermost first connection via 611 and the shape of the tapered vertical cross-sectional surface described above may be formed. However, an example embodiment thereof is not limited thereto.

The plurality of first connection vias 611, 612, and 613 may be integrated with each other. As an example, when three magnetic composite sheets are laminated on the lower side of the support substrate 200 and the coil portion 300, holes corresponding to the first connection vias 611, 612, and 613 may be formed in the three magnetic composite sheets, respectively, the magnetic composite sheets in which the holes are formed may be laminated in order on the lower side of the support substrate 200 and the coil portion 300 and may be cured to form the body 100, and the three holes connected to one another may be filled with a conductive material by electrolytic plating, thereby integrally forming the plurality of first connection vias 611, 612, and 613. Cracks created in the body 100 due to external stress may be formed along an interfacial surface, and in the example embodiment, as the plurality of first connection vias 611, 612, and 613 are integrally formed (that is, the interfacial surface is not formed therebetween), the possibility of cracks creating into the plurality of first connection vias 611, 612, and 613 may be reduced. Accordingly, the bonding force between the body 100 and the first connection electrode 610 may improve, and connection reliability between the coil portion 300 and the first external electrode 400 may improve.

The plurality of first connection vias 611, 612, and 613 may be formed of a conductive material such as copper (Cu), aluminum (Al), silver (Ag), tin (Sn), gold (Au), nickel (Ni), lead (Pb), chromium (Cr), titanium (Ti), or alloys thereof, but an example of the material is not limited thereto.

The insulating film IF may be disposed between the coil portion 300 and the body 100, and between the support substrate 200 and the body 100. The insulating layer IF may be formed along the surface of the support substrate 200 on which the coil patterns 311 and 312 and the first and second lead-out patterns 331 and 332 are formed, but an example embodiment thereof is not limited thereto. The insulating layer IF may be provided to insulate the coil portion 300 and the body 100, and may include a generally used insulating material such as paralin, but an example embodiment thereof is not limited thereto. As another example, the insulating layer IF may include an insulating material such as an epoxy resin other than paralin. The insulating layer IF may be formed by a vapor deposition method, but an example embodiment thereof is not limited thereto. As another example, the insulating film IF may be formed by laminating an insulating film for forming the insulating film IF on both surfaces of the support substrate 200 on which the coil portion 300 is formed and curing the film, or may be formed by applying an insulating paste for forming the insulating film IF on both surfaces of the support substrate 200 on which the coil portion 300 is formed and curing the paste. An opening may be formed in a portion of the region of the insulating layer IF covering the first and second lead-out patterns 331 and 332, and the upper portions of the first and second connection electrodes 610 and 620 may be connected to and in contact with the first and second lead-out patterns 331 and 332 through the opening. The opening may be formed before laminating the magnetic composite sheets, or may be formed by removing the insulating film IF exposed through the above-described connected hole after laminating the magnetic composite sheets, but an example embodiment thereof is not limited thereto. For the reasons mentioned above, the insulating film IF may not be provided in the example embodiment. In other words, in the case in which the body 100 has sufficient electrical resistance at the designed operating current and voltage of the coil component 1000 in the example embodiment, the insulating film IF may not be provided in the example embodiment.

The surface insulating layer 700 may cover a region of the first to sixth surfaces 101, 102, 103, 104, 105, and 106 of the body 100 other than a region in which the first and second external electrodes 400 and 500 are disposed. Accordingly, the surface insulating layer 700 may cover each of the first to fifth surfaces 101, 102, 103, 104, and 105 of the body 100, and may cover a central portion of the sixth surface 106 of the body 100. The surface insulating layer 700 may be, when the first and second external electrodes 400 and 500 are formed by plating, formed on the body 100 before the first and second external electrodes 400 and 500 are formed and may function as a mask for plating the first and second external electrodes 400 and 500, for example, but an example embodiment thereof is not limited thereto. At least portions of the surface insulating layers 700 disposed on the first to sixth surfaces 101, 102, 103, 104, 105, and 106 of the body 100 may be formed in the same process such that the portions may be integrated with each other without a boundary therebetween, but an example embodiment thereof is not limited thereto.

The surface insulating layer 700 may include a thermoplastic resin such as polystyrene resin, vinyl acetate resin, polyester resin, polyethylene resin, polypropylene resin, polyamide resin, rubber resin, acrylic resin, or the like, a thermosetting resin such as phenol resin, epoxy resin, urethane resin, melamine resin, alkyd resin, or the like, photosensitive resin, paraline, $SiO_x$, or $SiN_x$. The surface insulating layer 700 may further include an insulating filler such as an inorganic filler, but an example embodiment thereof is not limited thereto.

Figure 6:
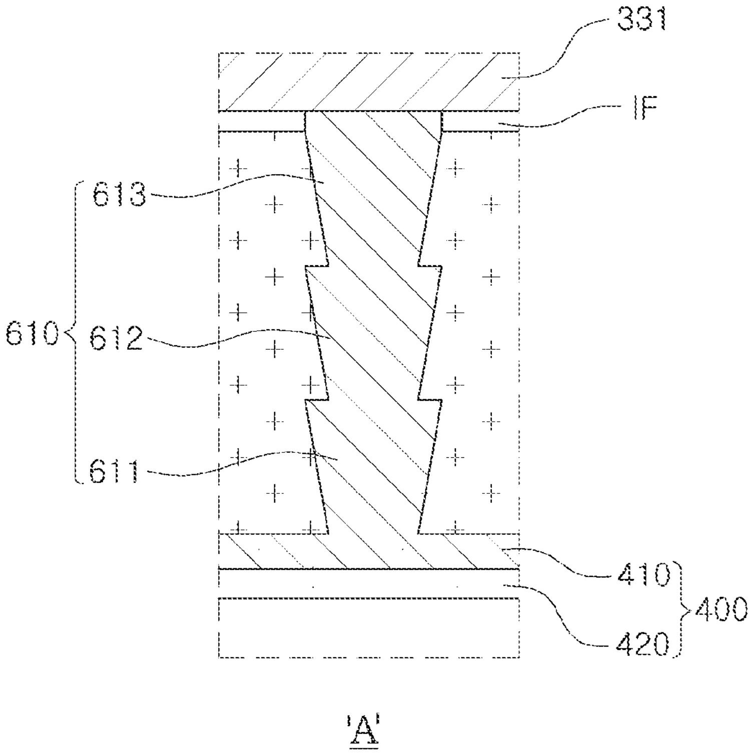
FIG. 6 is an enlarged diagram illustrating a modified example of portion A illustrated in FIG. 4.

FIG. 6 is an enlarged diagram illustrating a modified example of portion A illustrated in FIG. 4.

Referring to FIG. 6, in the modified example of the example embodiment, the plurality of first connection vias 611, 612, and 613 may be integrated with the first conductive layer 410 of the first external electrode 400. Accordingly, in the modified example, an interfacial surface may not be formed between the plurality of first connection vias 611, 612, and 613 and the first conductive layer 410 of the first external electrode 400.

The plurality of first connection vias 611, 612, and 613 and the first conductive layer 410 of the first external electrode 400 may be formed in the same plating process and may include the same metal. For example, the plurality of first connection vias 611, 612, and 613 and the first conductive layer 410 of the first external electrode 400 may be formed together through electrolytic copper plating, such that the plurality of first connection vias 611, 612, and 613 and the first conductive layer 410 of the first external electrode 400 may include copper (Cu) in common, but an example embodiment thereof is not limited thereto.

In the modified example, since the plurality of first connection vias 611, 612, and 613 and the first conductive layer 410 of the first external electrode 400 are integrated, bonding force between the body 100 and the first connection electrodes 610 may improve, and bonding force between the first connection electrodes 610 and the first external electrode 400 may improve. Thus, connection reliability between the coil portion 300 and the first external electrode 400 may improve.

Second Example Embodiment

Figure 7:
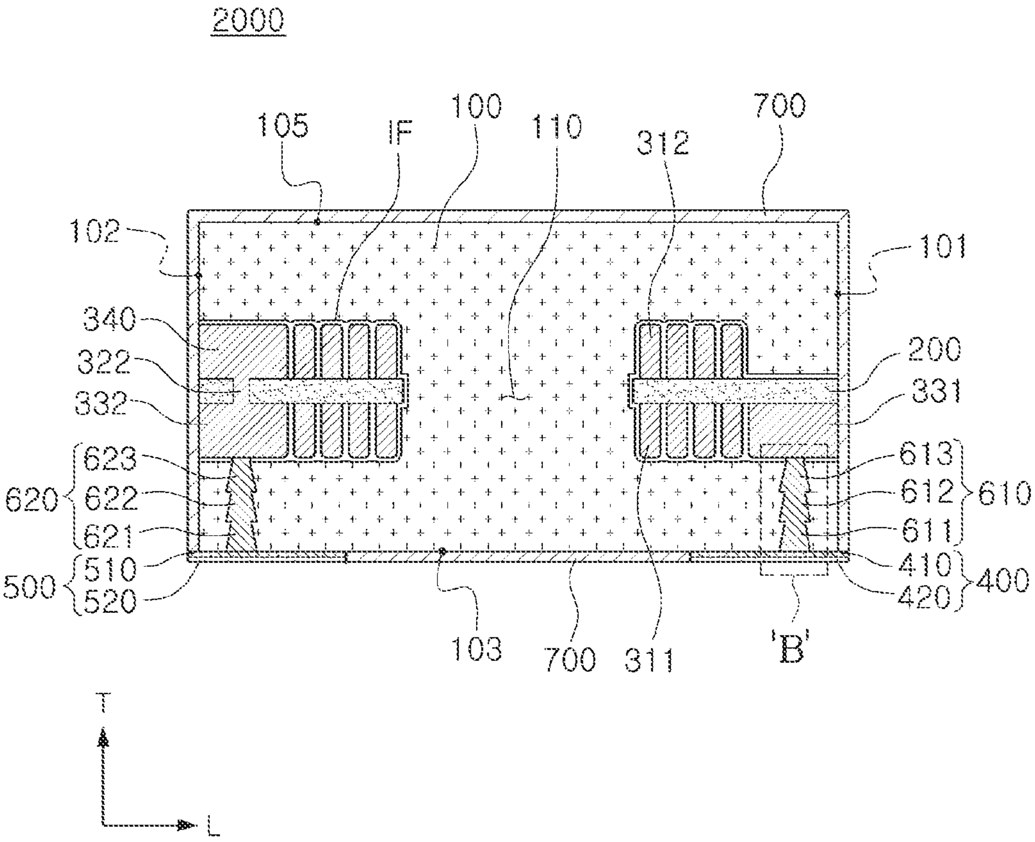
FIG. 7 is a diagram illustrating a coil component according to a second example embodiment of the present disclosure, corresponding to FIG. 4.
Figure 8:
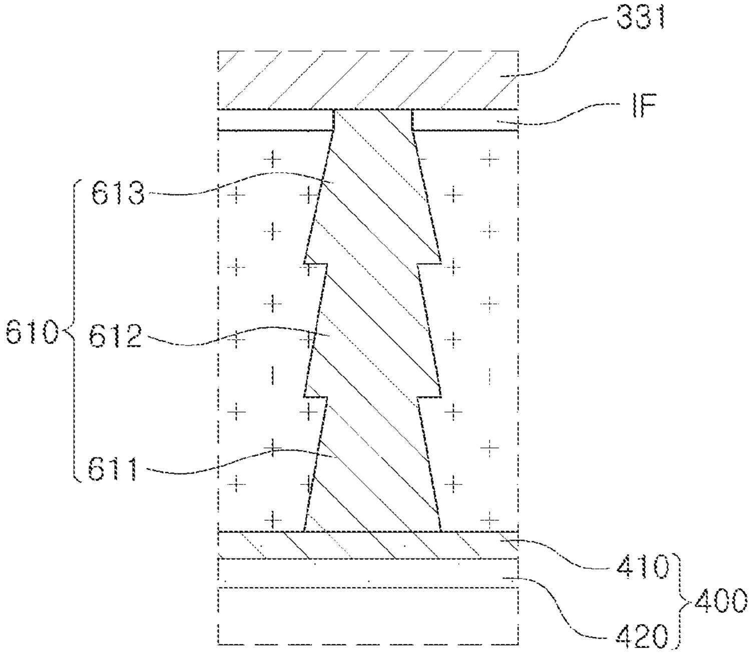
FIG. 8 is an enlarged diagram illustrating portion B illustrated in FIG. 7.

FIG. 7 is a diagram illustrating a coil component according to a second example embodiment, corresponding to FIG. 4. FIG. 8 is an enlarged diagram illustrating portion B illustrated in FIG. 7.

Referring to FIGS. 1 to 5 and 7 to 8, in the coil component 2000 in the example embodiment, the shapes of first and second the connection electrodes 610 and 620 may be different from those of the coil component 1000 of the first example embodiment. Thus, in the description of the example embodiment, only the first and second connection electrodes 610 and 620 different from those of the first example embodiment will be described. The same descriptions in the first example embodiment may be applied to the other elements of the example embodiment. Further, the modified example of the first example embodiment described above may also be applied to the example embodiment. In the description below, only the first connection via 610 and the plurality of first connection vias 611, 612, and 613 will be described for ease of description, and the same description may also be applied to the second connection via 620 and the second connection vias 621, 622, and 623.

Referring to FIGS. 7 and 8, in the example embodiment, in each of the plurality of first connection vias 611, 612, and 613, an end surface area of a lower portion may be greater than an end surface area of an upper portion. For example, with reference to the directions in FIGS. 7 and 8, in the lowermost first connection via 611 in contact with the first external electrode 400, an end surface area of a lower portion may be greater than an end surface area of an upper portion. Also, in the uppermost first connection via 613 in contact with the first lead-out pattern 331, an end surface area of a lower portion may be greater than an end surface area of an upper portion. Also, in the intermediate first connection via 612 disposed between the lowermost first connection via 611 and the uppermost first connection via 613, an end surface area of a lower portion may be greater than an end surface area of an upper portion. As an example, the end surface area of the lowermost first connecting via 611 may refer to a cross-sectional area of the lowermost first connecting via 611 on a cross-sectional surface parallel to the sixth surface 106 of the body 100. This description may also be applied to the intermediate first connection via 612 and the uppermost first connection via 613. The shape of the cross-sectional surface of each of the first connection vias 611, 612, and 613 may be a circular shape, for example, and the shapes of the cross-sectional surfaces of the first connection vias 611, 612 and 613 may be the same. Accordingly, the size relationship between the end surface areas of the upper and lower portions of the first connection vias 611, 612, and 613 may be the same as the size relationship among the lengths L11, L12, L21, L22, L31, and L32 of the upper and lower portions of the first connection vias 611, 612, and 613 taken in the length direction L illustrated in FIG. 8, illustrating the cross-sectional surface (L-T cross-sectional surface) along the length direction and the thickness direction. Since an end surface area of the lower portion is greater than an end surface area of the upper portion in each of the plurality of first connection vias 611, 612, and 613, bonding force between the body 100 and the plurality of first connection vias 611, 612, and 613 may improve as compared to the example in which an end surface area of the lower portion is the same as an end surface area of the upper portion in each of the plurality of first connection vias 611, 612, and 613. Also, as an example, since an end surface area of the lower portion of the intermediate first connecting via 612 is greater than an end surface area of the upper portion of the lowermost first connecting via 611, the lower surface of the intermediate first connecting via 612 may include a region which may not be covered by the upper surface of the lowermost first connecting via 611. Accordingly, due to the difference structure, the bonding force between the body 100 and the plurality of first connection vias 611, 612, and 613 may improve. The above-described difference structure may function as an anchor portion anchoring the first connection electrode 610. In at least one of the plurality of first connection vias 611, 612 and 613, a size of an end surface area may decrease from the lower portion to the upper portion. In the example embodiment, each of the lowermost first connection via 611, the intermediate first connection via 612, and the uppermost first connection via 613 may have an inversely tapered vertical cross-sectional surface of which a size of an end surface area may decrease from the lower portion to the upper portion. The body 100 may be formed by laminating at least one magnetic composite sheet on each of the upper and lower portions of the support substrate 200 and the coil portion 300 and curing the magnetic composite sheet. For example, the structure in which an end surface area of the lower portion of the lowermost first connection via 611 is greater than an end surface area of the upper portion described above may be implemented by forming a hole by irradiating a laser beam to an outermost magnetic composite sheet of the plurality of magnetic composite sheets laminated on the lower portion sides of the support substrate 200 and the coil portion 300 in a direction from an external side towards an internal side along a lamination direction, and laminating the sheets. By using the laser process, optical energy may vary according to a depth of the magnetic composite sheets, such that a hole having a shape corresponding to the size relationship between the end surface areas of the upper and lower portions of the lowermost first connection via 611 and the shape of the inversely tapered vertical cross-sectional surface described above may be formed. However, an example embodiment thereof is not limited thereto.

In the example embodiment, since an end surface area of the lower portion of the lowermost first connection via 611 in contact with the first external electrode 400 is larger than an end surface area of the upper portion, a contact area between the lowermost first connection via 611 and the first external electrode 400 may increase, such that connection reliability between the elements may improve.

Third Example Embodiment

Figure 9:
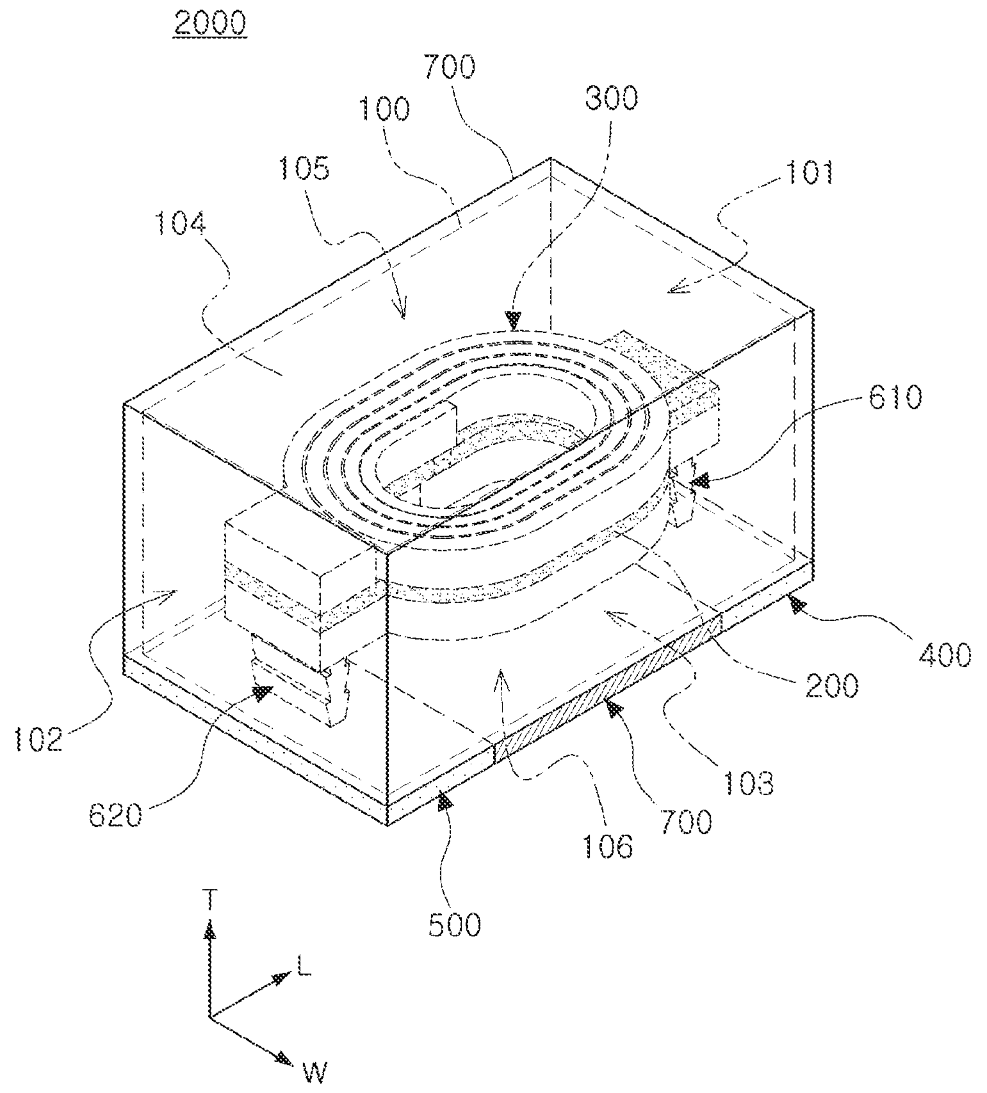
FIG. 9 is a diagram illustrating a coil component according to a third example embodiment of the present disclosure.
Figure 10:
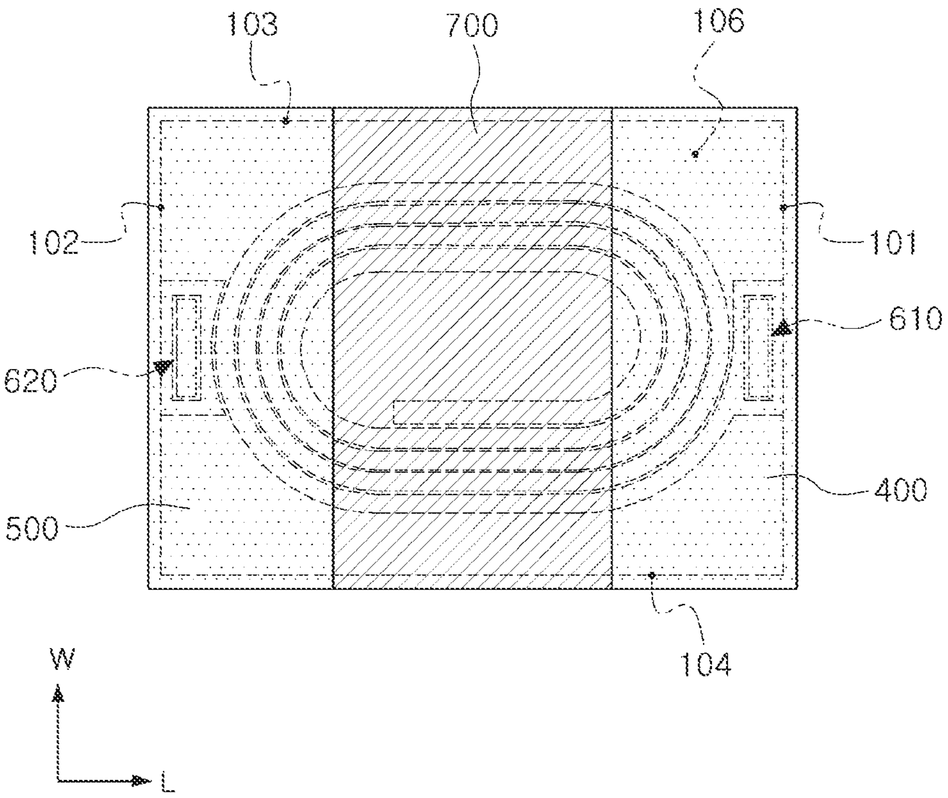
FIG. 10 is a diagram illustrating the coil component illustrated in FIG. 9, viewed from below.

FIG. 9 is a diagram illustrating a coil component according to a third example embodiment. FIG. 10 is a diagram illustrating the coil component illustrated in FIG. 9, viewed from below.

Referring to FIGS. 1 to 5 and 9 to 10, in a coil component 3000 in the example embodiment, the shapes of the first and second connection electrodes 610 and 620 may be different from those of the coil component 1000 in the first example embodiment. Therefore, in the example embodiment, only the first and second connection electrodes 610 and 620 different from those of the first example embodiment will be described. The same descriptions in the first example embodiment may be applied to the other elements of the example embodiment. Further, the modified example of the first example embodiment described above may also be applied to the example embodiment. In the description below, only the first connection via 610 and the plurality of first connection vias 611, 612, and 613 will be described for ease of description, and the same description may also be applied to the second connection via 620 and the plurality of second connection vias 621, 622, and 623.

Referring to FIGS. 9 and 10, in the example embodiment, a dimension of each of the plurality of first connection vias 611, 612, and 613 in the width direction W may be greater than a dimension in the length direction L on a cross-sectional surface parallel to the sixth surface 106 of the body 100. Accordingly, in each of the plurality of first connection vias 611, 612, and 613, the dimension in the width direction W may be larger than the dimension the length direction (L), such that each of the plurality of first connection vias 611, 612, and 613 may be configured as a bar-shaped via, the cross sectional surface of which has a bar shape.

In the example embodiment, since the lowermost first connection via 611 is configured as a bar-shaped via, a size of an area of the lowermost first connection via 611 in contact with the first external electrode 400 may increase, as compared to the example in which the lowermost first connection via 611 has a circular cross-sectional surface. Accordingly, connection reliability between the first connection electrode 610 and the first external electrode 400 may improve. Also, since each of the plurality of first connection vias 611, 612, and 613 is configured as a bar-shaped via, a size of an area of the anchor portion described above may increase. Accordingly, the bonding force between the body 100 and the first connection electrode 610 may improve.

According to the aforementioned example embodiments, by forming an electrode structure on a lower surface, an effective volume of a magnetic material of the coil component may improve.

Also, delamination between the coil portion and the body may be prevented.

While the example embodiments have been illustrated and described above, it will be apparent to those skilled in the art that modifications and variations could be made without departing from the scope of the present invention as defined by the appended claims.

What is claimed is:

1. A coil component, comprising:
- a body;
- a coil portion disposed in the body and including a lead-out pattern;
- an external electrode disposed on a first surface of the body and comprising a first conductive layer and a second conductive layer disposed on the first conductive layer; and
- a plurality of connection vias disposed in the body, connecting the external electrode to the lead-out pattern,
- wherein, in each of the plurality of connection vias, a size of an end surface area of a lower portion relatively proximate to the external electrode is different from a size of an end surface area of an upper portion relatively proximate to the lead-out pattern,
- wherein a connection via, among the plurality of connection vias, closest to the external electrode extends to the first surface to form the first conductive layer of the external electrode, wherein an entirety of the plurality of the connection vias and the first conductive layer are formed of a same material without an interface formed internally therebetween.

2. The coil component of claim 1, wherein, in each of the plurality of connection vias, the end surface area of the lower portion is smaller than the end surface area of the upper portion.

3. The coil component of claim 2, wherein the size of the end surface area of at least one of the plurality of connection vias increases from the lower portion to the upper portion.

4. The coil component of claim 2,
- wherein the external electrode includes a first conductive layer in contact with the first surface of the body and a second conductive layer disposed on the first conductive layer, and
- wherein the plurality of connection vias are integrated with the first conductive layer of the external electrode.

5. The coil component of claim 4, wherein each of the plurality of connection vias and the first conductive layer of the external electrode includes copper (Cu).

6. The coil component of claim 2,
- wherein the body has a second surface opposing the first surface, a first end surface and a second end surface connecting the first surface to the second surface and opposing each other in a width direction, and a first side surface and a second side surface connecting the first end surface to the second end surface and opposing each other in a length direction,
- wherein a dimension of each of the plurality of connection vias in the width direction is greater than a dimension in the length direction on a cross-sectional surface parallel to first surface of the body.

7. The coil component of claim 2,
- wherein the body has a second surface opposing the first surface, a first end surface and a second end surface connecting the first surface to the second surface and opposing each other in a width direction, and first side surface and a second side surface connecting the first end surface to the second end surface and opposing each other in a length direction, wherein the body further includes a support substrate disposed therein, wherein the coil portion includes a first coil pattern disposed on a first surface of the support substrate opposing the first surface of the body, and first and second lead-out patterns disposed on the first surface of the support substrate and spaced apart from each other, wherein the external electrode includes first and second external electrodes disposed on the first surface of the body and spaced apart from each other, and wherein the plurality of connection vias include a plurality of first connection vias connecting the first lead-out pattern to the first external electrode and laminated and integrated with each other, and a plurality of second connection vias connecting the second lead-out pattern to the second external electrode and laminated and integrated with each other.

8. The coil component of claim 7, wherein the coil portion further includes a sub-lead-out pattern disposed on the second surface of the support substrate opposing the first surface of the support substrate, and a through via penetrating the support substrate and connecting the sub-lead-out pattern to the second lead-out pattern.

9. The coil component of claim 1, wherein, in each of the plurality of connection vias, an end surface area of the lower portion is greater than an end surface area of the upper portion.

10. The coil component of claim 9, wherein a size of an end surface area of at least one of the plurality of connection vias decreases from the lower portion to the upper portion.

11. A coil component, comprising:

a body having a first surface;

a support substrate disposed in the body;

a coil portion including first and second lead-out patterns disposed on the first surface of the support substrate opposing the first surface of the body;

first and second external electrodes disposed on the first surface of the body and spaced apart from each other and comprising a first conductive layer and a second conductive layer;

a first connection electrode disposed in the body, extending from the first lead-out pattern to the first external electrode, and integrally formed between the first lead-out pattern and the first external electrode, the first connection electrode including a plurality of first connection vias; and a second connection electrode disposed in the body, extending from the second lead-out pattern to the second external electrode, and integrally formed between the second lead-out pattern and the second external electrode, the second connection electrode including a plurality of second connection vias, wherein an entirety of each of the plurality of first and second connection vias is formed of a same material without an interface formed internally therebetween, wherein a first connection via, among the plurality of first connection vias, extends to the first surface of the body to form the first conductive layer of the first external electrode without an interface formed internally therebetween, wherein a second connection via, among the plurality of second connection vias, extends to the first surface of the body to form the first conductive layer of the second external electrode without an interface formed internally therebetween, wherein, when an end surface area parallel to the first surface of the body is defined as a cross-sectional area, each of the at least one of the first and second connection vias includes an anchor portion having a cross-sectional area larger than a cross-sectional area of a remainder of a corresponding of the first and second connection vias.

12. A coil component, comprising:

a support substrate having a first surface;

a coil pattern disposed on the first surface and having a lead-out portion;

a body encapsulating the support substrate and the coil pattern, the body having a first surface parallel to the first surface of the support substrate;

an external electrode disposed on the first surface of the body and comprising a first conductive layer and a second conductive layer; and stacked connection vias disposed between the lead-out portion and the external electrode, each connection via having a cross-section tapering from the lead-out portion to the first surface of the body, wherein a portion of a connection via, among the connection vias, contacting the first surface extends to form the first conductive layer of the external electrode, wherein an entirety of each of the connection vias and the first conductive layer are formed of a same material without an interface formed internally therebetween.

13. The coil component of claim 12, wherein an area of contact between the lead-out portion and at least one of the connection vias is greater than an area of contact between the connection vias and the external electrode.

14. The coil component of claim 12, wherein the connection vias, in a plane parallel to the first surface of the support substrate, have a rectangular shape.

* * * * *